United States Patent
Melendo Casado et al.

(10) Patent No.: US 10,714,093 B2
(45) Date of Patent: *Jul. 14, 2020

(54) HOTWORD DETECTION ON MULTIPLE DEVICES

(71) Applicant: Google LLC, Mountain View, CA (US)

(72) Inventors: Diego Melendo Casado, Mountain View, CA (US); Alexander H. Gruenstein, Mountain View, CA (US); Jakob Nicolaus Foerster, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/362,284

(22) Filed: Mar. 22, 2019

(65) Prior Publication Data

US 2019/0287534 A1   Sep. 19, 2019

Related U.S. Application Data

(63) Continuation of application No. 15/952,434, filed on Apr. 13, 2018, now Pat. No. 10,242,676, which is a
(Continued)

(51) Int. Cl.
*G10L 15/26* (2006.01)
*G10L 15/30* (2013.01)
(Continued)

(52) U.S. Cl.
CPC .............. *G10L 15/30* (2013.01); *G10L 15/22* (2013.01); *G10L 25/78* (2013.01); *H04L 67/10* (2013.01);
(Continued)

(58) Field of Classification Search
CPC .............. G10L 15/22; G10L 2015/223; G10L 2021/02166; G10L 15/26; G10L 15/265;
(Continued)

(56) References Cited

U.S. PATENT DOCUMENTS

| 4,363,102 A | 12/1982 | Holmgren |
| 5,659,665 A | 8/1997 | Whelpley, Jr. |

(Continued)

FOREIGN PATENT DOCUMENTS

| EP | 1511277 | 3/2005 |
| JP | S59-180599 | 10/1984 |

(Continued)

OTHER PUBLICATIONS

"Speaker Recognition", Wikipedia, the free encyclopedia, 5 pages, last modified on Jan. 30, 2014; downloaded from the internet on May 15, 2014, http://en.wikipedia.org/wiki/Speaker_recognition.
(Continued)

*Primary Examiner* — Huyen X Vo
(74) *Attorney, Agent, or Firm* — Honigman LLP; Brett A. Krueger; Grant Griffith

(57) ABSTRACT

Methods, systems, and apparatus, including computer programs encoded on a computer storage medium, for hotword detection on multiple devices are disclosed. In one aspect, a method includes the actions of receiving audio data that corresponds to an utterance. The actions further include determining that the utterance likely includes a particular, predefined hotword. The actions further include transmitting (i) data indicating that the computing device likely received the particular, predefined hotword, (ii) data identifying the computing device, and (iii) data identifying a group of nearby computing devices that includes the computing device. The actions further include receiving an instruction to commence speech recognition processing on the audio data. The actions further include in response to receiving the instruction to commence speech recognition processing on the audio data, processing at least a portion of the audio data using an automated speech recognizer on the computing device.

16 Claims, 4 Drawing Sheets

Related U.S. Application Data continuation of application No. 15/278,269, filed on Sep. 28, 2016, now Pat. No. 9,972,320.

(60) Provisional application No. 62/378,869, filed on Aug. 24, 2016.

(51) Int. Cl.
  *G10L 15/22* (2006.01)
  *G10L 25/78* (2013.01)
  *H04L 29/08* (2006.01)
  *G10L 15/08* (2006.01)
  *G10L 15/16* (2006.01)

(52) U.S. Cl.
  CPC ........ G10L 15/16 (2013.01); G10L 2015/088 (2013.01); G10L 2015/223 (2013.01); H05K 999/99 (2013.01)

(58) Field of Classification Search
  CPC ......... G10L 15/32; G10L 17/00; G10L 25/78; G10L 15/00; G10L 15/063; G10L 15/10; G10L 15/1815; G10L 15/222; G10L 15/30; G10L 2015/088; G10L 2015/226; G10L 25/21
  See application file for complete search history.

(56) References Cited

U.S. PATENT DOCUMENTS

| | | | |
|---|---|---|---|
| 5,895,448 A | 4/1999 | Vysotsky et al. |
| 5,897,616 A | 4/1999 | Kanevsky |
| 6,023,676 A | 2/2000 | Erell |
| 6,141,644 A | 10/2000 | Kuhn |
| 6,567,775 B1 | 5/2003 | Maali |
| 6,671,672 B1 | 12/2003 | Heck |
| 6,744,860 B1 | 6/2004 | Schrage |
| 6,826,159 B1 | 11/2004 | Shaffer |
| 6,931,375 B1 | 8/2005 | Bossemeyer |
| 6,973,426 B1 | 12/2005 | Schier |
| 7,016,833 B2 | 3/2006 | Gable |
| 7,222,072 B2 | 5/2007 | Chang |
| 7,571,014 B1 | 8/2009 | Lambourne et al. |
| 7,720,012 B1 | 5/2010 | Borah |
| 7,904,297 B2 | 3/2011 | Mirkovic et al. |
| 8,099,288 B2 | 1/2012 | Zhang |
| 8,200,488 B2 | 6/2012 | Kemp et al. |
| 8,209,174 B2 | 6/2012 | Al-Telmissani |
| 8,209,184 B1 | 6/2012 | Dragosh et al. |
| 8,214,447 B2 | 7/2012 | Deslippe et al. |
| 8,340,975 B1 | 12/2012 | Rosenberger |
| 8,543,402 B1 | 9/2013 | Ma |
| 8,588,949 B2 | 11/2013 | Lambourne et al. |
| 8,595,007 B2 | 11/2013 | Kane |
| 8,645,137 B2 | 2/2014 | Bellegarda et al. |
| 8,670,985 B2 | 3/2014 | Lindahl et al. |
| 8,713,119 B2 | 4/2014 | Lindahl |
| 8,717,949 B2 | 5/2014 | Crinon |
| 8,719,009 B2 | 5/2014 | Baldwin et al. |
| 8,719,018 B2 | 5/2014 | Dinerstein |
| 8,768,687 B1 | 7/2014 | Quasthoff et al. |
| 8,775,191 B1 | 7/2014 | Sharifi et al. |
| 8,805,890 B2 | 8/2014 | Zhang et al. |
| 8,838,457 B2 | 9/2014 | Cerra et al. |
| 8,938,394 B1 | 1/2015 | Faaborg et al. |
| 8,996,372 B1 | 3/2015 | Secker-Walker |
| 9,142,218 B2 | 9/2015 | Schroeter |
| 2002/0049596 A1 | 4/2002 | Burchard et al. |
| 2002/0072905 A1 | 6/2002 | White |
| 2002/0123890 A1 | 9/2002 | Kopp |
| 2002/0193991 A1 | 12/2002 | Bennett et al. |
| 2003/0200090 A1 | 10/2003 | Kawazoe |
| 2003/0220797 A1 | 11/2003 | Ito |
| 2003/0231746 A1 | 12/2003 | Hunter |
| 2003/0236099 A1 | 12/2003 | Deisher et al. |
| 2004/0101112 A1 | 5/2004 | Kuo |
| 2004/0158457 A1 | 8/2004 | Veprek et al. |
| 2004/0230420 A1 | 11/2004 | Kadambe et al. |
| 2005/0135583 A1 | 6/2005 | Kardos et al. |
| 2005/0165607 A1 | 7/2005 | Di Fabbrizio et al. |
| 2006/0074656 A1 | 4/2006 | Mathias |
| 2006/0085188 A1 | 4/2006 | Goodwin et al. |
| 2006/0184370 A1 | 8/2006 | Kwak et al. |
| 2007/0100620 A1 | 5/2007 | Tavares |
| 2007/0198262 A1 | 8/2007 | Mindlin |
| 2007/0198849 A1 | 8/2007 | Mozer |
| 2009/0240488 A1 | 9/2009 | White |
| 2009/0258333 A1 | 10/2009 | Yu |
| 2009/0292541 A1 | 11/2009 | Daya |
| 2010/0070276 A1 | 3/2010 | Wasserblat |
| 2010/0110834 A1 | 5/2010 | Kim |
| 2011/0026722 A1 | 2/2011 | Jing |
| 2011/0054892 A1 | 3/2011 | Jung |
| 2011/0060587 A1 | 3/2011 | Phillips et al. |
| 2011/0066429 A1 | 3/2011 | Shperling |
| 2011/0184730 A1 | 7/2011 | LeBeau et al. |
| 2011/0282661 A1 | 11/2011 | Dobry et al. |
| 2011/0304648 A1 | 12/2011 | Kim et al. |
| 2012/0084087 A1 | 4/2012 | Yang |
| 2012/0136923 A1 | 5/2012 | Grube |
| 2012/0232896 A1 | 9/2012 | Taleb |
| 2012/0245941 A1 | 9/2012 | Cheyer |
| 2012/0265528 A1 | 10/2012 | Gruber et al. |
| 2013/0006634 A1 | 1/2013 | Grokop et al. |
| 2013/0024196 A1 | 1/2013 | Ganong et al. |
| 2013/0060571 A1 | 3/2013 | Soemo et al. |
| 2013/0124207 A1 | 5/2013 | Sarin et al. |
| 2013/0132086 A1 | 5/2013 | Xu et al. |
| 2013/0183944 A1 | 7/2013 | Mozer |
| 2013/0262873 A1 | 10/2013 | Read et al. |
| 2013/0289996 A1 | 10/2013 | Fry |
| 2013/0325484 A1 | 12/2013 | Chakladar et al. |
| 2014/0006825 A1 | 1/2014 | Shenhav |
| 2014/0012573 A1 | 1/2014 | Hung |
| 2014/0012578 A1 | 1/2014 | Morioka |
| 2014/0074471 A1 | 3/2014 | Sankar et al. |
| 2014/0088961 A1 | 3/2014 | Woodward |
| 2014/0163978 A1 | 6/2014 | Basye |
| 2014/0222430 A1 | 8/2014 | Rao |
| 2014/0257821 A1 | 9/2014 | Adams |
| 2014/0278383 A1 | 9/2014 | Fan |
| 2014/0278435 A1 | 9/2014 | Ganong, III |
| 2014/0337032 A1 | 11/2014 | Aleksic et al. |
| 2015/0081295 A1 | 3/2015 | Yun |
| 2015/0154953 A1 | 6/2015 | Bapat |
| 2015/0228274 A1 | 8/2015 | Leppanen |
| 2015/0262577 A1 | 9/2015 | Nomura |
| 2015/0379899 A1 | 12/2015 | Balasubramanian |
| 2016/0104483 A1 | 4/2016 | Foerster et al. |
| 2016/0155443 A1* | 6/2016 | Khan ............... G06F 1/3203 704/275 |
| 2016/0189715 A1 | 6/2016 | Nishikawa |
| 2016/0217790 A1 | 7/2016 | Sharifi |
| 2016/0260431 A1 | 9/2016 | Newendorp |
| 2016/0294973 A1* | 10/2016 | Bakshi ............... H04L 67/306 |
| 2017/0083285 A1* | 3/2017 | Meyers ............... G10L 15/063 |
| 2017/0084277 A1 | 3/2017 | Sharifi |
| 2018/0012604 A1 | 1/2018 | Guervara et al. |
| 2018/0286406 A1 | 10/2018 | Casado et al. |

FOREIGN PATENT DOCUMENTS

| | | |
|---|---|---|
| JP | H09-62293 | 3/1997 |
| JP | H11-52976 | 2/1999 |
| JP | H11-231896 | 8/1999 |
| JP | 2000-310999 | 11/2000 |
| JP | 2006-227634 | 8/2006 |
| KR | 10-2014-0031391 | 3/2014 |
| WO | WO 1998040875 | 9/1998 |
| WO | WO 2013/163113 | 10/2013 |
| WO | WO 2014/008194 | 1/2014 |

(56) References Cited

FOREIGN PATENT DOCUMENTS

| WO | WO 2014/130463 | 8/2014 |
|---|---|---|
| WO | WO 2015/025330 | 2/2015 |

OTHER PUBLICATIONS

"Voice Biometrics Evaluation Studio™ 8.2 :: Product Description", Customer Care Solutions from Nuance, 2012, 6 pages.
Auckenthaler et al. "Score Normalization for Text-independent Speaker Verification System," Digital Signal Processing, vol. 10, 2000, 13 pages.
European Examination Report issued in European Application No. 16207288.8-1210, dated Aug. 1, 2018, 5 pages.
European Office Action issued in Application No. 15781811.3, dated Aug. 23, 2017, 6 pages.
Extended European Search Report in European Application No. 16207288.8-1914, dated Apr. 4, 2017, 8 pages.
Extended European Search Report issued in Application No. 16195834.3-1910, dated Nov. 23, 2016, 9 pages.
Germain, François G. et al., "Speaker and Noise Independent Voice Activity Detection", Mar. 26, 2013, 9 pages.
Hurmalainen, Antti et al., "Detection, Separation and Recognition of Speech from Continuous Signals Using Spectral Factorisation", $20^{th}$ European Signal Processing Conference (EUSIPCO 2012), Bucharest, Romania, Aug. 27-31, 2012, 5 pages.
International Preliminary Report on Patentability in International application No. PCT/US2015/030569, dated Jan. 24, 2017, 8 pages.
International Preliminary Report on Patentability in International Application No. PCT/US2015/052860, dated Apr. 11, 2017, 9 pages.
International Preliminary Report on Patentability issued in International Application PCT/US2017/045123, dated Mar. 7, 2019, 9 pages.
International Search Report and Written Opinion issued in International Application No. PCT/US2017/045123, dated Nov. 8, 2017, 15 pages.
Jae-Seung, Choi, "Text-dependent Speaker Recognition using Characteristic Vectors in Speech Signal and Normalized Recognition Method," Journal of Korean Institute of Information Technology, 10(5), May 2012 (English Abstract).
Japanese Office Action issued in Japanese Application No. 2017-170185, dated Oct. 1, 2018, 17 pages (with English Abstract).
Kim, Youngmoo E. et al., "Comparison of a Joint Iterative Method for Multiple Speaker Identification with Sequential Blind Source Separation and Speaker Identification", Proceedings of the 2008 IEEE Odyssey Workshop on Speaker and Language Recognition, Stellenbosch, South Africa, 8 pages.
Korean Office Action issued in Application No. 10-2016-7027999, dated Aug. 28, 2017, 9 pages (with English Translation).
Korean Office Action issued in Application No. 10-2016-7033161, dated Dec. 19, 2017, 10 pages (with English Translation).
Kotti, Margarita et al., "Speaker Segmentation and Clustering", Preprint submitted to Elsevier Preprint Oct. 31, 2007, 54 pages.
Kwon, Soonil et al., "Unsupervised Speaker Indexing Using Generic Models", IEEE Transaction on Speech and Audio Processing, vol. 13, No. 5, Sep. 2005, 10 pages.
Maes, Stéphanie H. et al., "Conversational Speech Biometrics," J. Liu and Y. Ye (Eds.): E-Commerce Agents, LNAI 2033, Springer-Verlag, Berlin Heidelberg 2001, 14 pages.
Navrátil, U.V. et al., "A Speech Biometrics System with Multi-Grained Speaker Modeling", 2000, 5 pages.
Notice of Allowance in Japanese Application No. 2016-551250, dated Aug. 7, 2017, 3 pages (English Translation).
Notice of Allowance in Korean Application No. 10-2016-7021778, dated Apr. 25, 2017, (no English translation yet).
Notice of Allowance in U.S. Appl. No. 15/201,972, dated Jun. 1, 2017, 10 pages.
Office Action in Japanese Application No. 2016-551250, dated Apr. 10, 2017, 6 pages (English Translation).
Office Action in Korean Application No. 10-2016-7021778, dated Dec. 13, 2016, 4 pages.
Office Action issued in Korean Application No. 10-2016-7022701, dated Aug. 17, 2017, 4 pages (English Translation).
Office Action issued in Korean Application No. 10-2016-7027999, dated Apr. 12, 2017, 9 pages (English Translation).
Office Action issued in U.S. Appl. No. 15/346,914, dated Jun. 20, 2017, 25 pages.
PCT Written Opinion issued in International Application No. PCT/US2017/045123, dated Jul. 27, 2018, 4 pages.
Ramfrez, Javier et al., "Statistical Voice Activity Detection Using a Multiple Observation Likelihood Ratio Test", IEEE Signal Processing Letters, vol. 12, No. 10, Oct. 2005, 4 pages.
Schabus, Dietmar et al., "Objective and Subjective Feature Evaluation for Speaker-Adaptive visual Speech Synthesis", International Conference on Auditory-Visual Processing, 2013, 6 pages.
Walsh, John MacLaren et al., Joint Iterative Multi-Speaker Identification and Source Separation Using Expectation Propagation:, Proceedings of the 2007 IEEE Workshop on Applications of Signal Processing to Audio and Acoustics, New Paltz, NY, 4 pages.

\* cited by examiner

HOTWORD DETECTION ON MULTIPLE DEVICES

CROSS-REFERENCE TO RELATED APPLICATIONS

This application is a continuation of U.S. patent application Ser. No. 15/952,434, filed Apr. 13, 2018, which is a continuation of U.S. patent application Ser. No. 15/278,269, filed Sep. 28, 2016, which claims the benefit of U.S. Provisional Application No. 62/378,869, filed Aug. 24, 2016, the contents of each are incorporated by reference herein.

TECHNICAL FIELD

This specification generally relates to automated speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed at an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which may perform speech recognition techniques or use audio features and neural networks to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

As systems that are configured to respond to hotwords become more prevalent, the likelihood of more than one being near a user when the user speaks the hotword increases. For example, a user may be in the living room watching television. A tablet may be on the table, and a phone may be on the couch next to the user. Upon speaking, "OK computer, play music," the user likely does not want the phone, tablet, and television to begin playing music. Instead, the user only wants one of the devices to respond. When the phone, tablet, and television detect a hotword, they each communicate with a server and notify the server that the device detected a hotword. With each notification sent to the server, each device transmits a group identifier and the type of device. The group identifier is data that identifies a device group from which only one device should respond to a hotword. For example, devices in the same groom will share a group identifier.

When the server receives data from each of the phone, tablet, and television, the server compares the context data of each device to determine which one should respond to the hotword. The context data may include the capabilities of the devices, the time since each device was previously used, the previous action preformed, the location of the device, and the loudness of the detected hotword. Based on this context data, the server selects one of the devices to respond to the hotword. For example, the server may select the tablet to respond to the hotword based on the devices being located at the user's home and the fact that the user most commonly uses the tablet while at home. The server then provides an instruction to the tablet to process the user's speech. The tablet processes the "play music" command and begins to play music. The server also provides instructions to the television and phone not to process the user's speech. The phone returns to its previous state, and the television continues to play the television show without interruption.

An innovative aspect of the subject matter described in this specification may be embodied in methods that include the actions of receiving, by a computing device, audio data that corresponds to an utterance; determining that the utterance likely includes a particular, predefined hotword; in response to determining that the utterance likely includes the particular, predefined hotword, transmitting, to a server, (i) data indicating that the computing device likely received the particular, predefined hotword, (ii) data identifying the computing device, and (iii) data identifying a group of nearby computing devices that includes the computing device; receiving, from the server, an instruction to commence speech recognition processing on the audio data; and in response to receiving the instruction to commence speech recognition processing on the audio data, processing at least a portion of the audio data using an automated speech recognizer on the computing device.

These and other embodiments can each optionally include one or more of the following features. The actions further include receiving, from an additional computing device, data indicating that the additional computing device is configured to respond to a particular, predefined hotword; transmitting, to the additional computing device, data indicating that the computing device is configured to respond to a particular, predefined hotword; determining a group identifier for a group of computing devices that includes the computing device and the additional computing device; and transmitting, to the additional computing device, the group identifier. The additional computing device is a computing device that is nearby the computing device. The data identifying the group of nearby computing devices that includes the computing device is the group identifier. The actions further include receiving, by the computing device, additional audio data that corresponds to an additional utterance; determining that the additional utterance likely includes the particular, predefined hotword; in response to determining that the utterance likely includes the particular, predefined hotword, transmitting, to the server, (i) the data indicating that the computing device likely received the particular, predefined hotword, (ii) the data identifying the computing device, and (iii) the data identifying the group of nearby computing devices that includes the computing device; receiving, from the server, an instruction to not commence speech recognition processing on the audio data; and in response to receiving the instruction to not commence speech recognition processing on the audio data, ceasing processing of the audio data using the automated speech recognizer on the computing device.

The actions further include determining a loudness of the audio data associated with the particular, predefined hotword; and in response to determining that the utterance likely includes the particular, predefined hotword, transmitting, to the server, the loudness of the audio data associated with the particular, predefined hotword. The action of determining a loudness of the audio data associated with the particular, predefined hotword includes determining a power of the audio data associated with the particular, predefined hotword; and determining a power of audio data that is not associated with the particular, predefined hotword and that the computing device received before the audio data associated with the particular, predefined hotword. The loudness of the audio data associated with the particular, predefined hotword is based on the power of the audio data associated with the particular, predefined hotword and the power of the audio data that is not associated with the particular, predefined hotword and that the computing device received before the audio data associated with the particular, predefined hotword. The actions further include determining a confidence score that reflects a likelihood that the audio data associated with the particular, predefined hotword corresponds to the particular, predefined hotword; and in response to determining that the utterance likely includes the particular, predefined hotword, transmitting, to the server, confidence score.

The action of determining a confidence score that reflects a likelihood that the audio data associated with the particular, predefined hotword corresponds to the particular, predefined hotword includes determining audio features from the audio data associated with the particular, predefined hotword; and based on the audio features, determining, using a neural network, the confidence score. The actions further include, in response to determining that the utterance likely includes the particular, predefined hotword, transmitting, to the server, data indicating a location of the computing device. The actions further include, in response to determining that the utterance likely includes the particular, predefined hotword, transmitting, to the server, data indicating an elapsed time since a previous use of the computing device. The actions further include, in response to determining that the utterance likely includes the particular, predefined hotword, transmitting, to the server, data indicating a previous action performed by the computing device.

Other embodiments of this aspect include corresponding systems, apparatus, and computer programs recorded on computer storage devices, each configured to perform the operations of the methods.

Another innovative aspect of the subject matter described in this specification may be embodied in methods that include the actions of receiving, by a server and from a computing device, (i) data indicating that the computing device likely received a particular, predefined hotword, (ii) data identifying the computing device, and (iii) data identifying a group of computing devices that are near the computing device and that includes the computing device; accessing context data that indicates a context of the computing device; based on the context data of the computing device, determining that the computing device commence speech recognition processing on audio data associated with the particular, predefined hotword; and transmitting, to the computing device, an instruction to commence speech recognition processing on the audio data associated with the particular, predefined hotword.

These and other embodiments can each optionally include one or more of the following features. The actions further include receiving, by a server and from an additional computing device, (i) data indicating that the additional computing device likely received the particular, predefined hotword, (ii) data identifying the additional computing device, and (iii) data identifying the group of computing devices that are near the additional computing device and that includes the computing device and the additional computing device; accessing context data that indicates a context of the additional computing device; based on the context data of the computing device and the context data of the additional computing device, determining that the additional computing device not commence speech recognition processing on the audio data associated with the particular, predefined hotword; and transmitting, to the additional computing device, an instruction to not commence speech recognition processing on the audio data associated with the particular, predefined hotword.

The actions further include receiving, by a server and from a first computing device, data indicating that the first computing device is configured to respond to a particular, predefined hotword; receiving, by a server and from a second computing device, data indicating that the second computing device is configured to respond to the particular, predefined hotword; determining, by the server, a group identifier for a group of computing devices that includes the first computing device and the second computing device; and transmitting, to the first computing device and the second computing device, the group identifier. The data identifying the group of computing devices that are near the computing device and that includes the computing device is the group identifier. The audio data associated with the particular, predefined hotword is audio data that corresponds to an utterance. The context data that indicates a context of the computing device includes data indicating one of more capabilities of the computing device.

The action of determining that the computing device commence speech recognition processing on audio data associated with the particular, predefined hotword is based on the one of more capabilities of the computing device. The context data that indicates a context of the computing device includes data indicating an elapsed time since a previous use of the computing device. The action of determining that the computing device commence speech recognition processing on audio data associated with the particular, predefined hotword is based on the elapsed time since the previous use of the computing device. The context data that indicates a context of the computing device includes data indicating a previous action performed by the computing device. The action of determining that the computing device commence speech recognition processing on audio data associated with the particular, predefined hotword is based on the previous action performed by the computing device. The actions further include receiving, from the computing device data indicating a loudness of the audio data associated with the particular, predefined hotword. The action of determining that the computing device commence speech recognition processing on the audio data associated with the particular, predefined hotword is further based on the loudness of the audio data associated with the particular, predefined hotword.

The actions further include receiving, by the server and from the computing device, data indicating a location of the computing device. The action of determining that the computing device commence speech recognition processing on audio data associated with the particular, predefined hotword is further based on the location of the computing device. The actions further include receiving, from the computing device, data indicating an action associated with the audio data and data indicating actions performed by the computing device within a particular period of time after receiving the instruction to commence speech recognition processing on the audio data associated with the particular, predefined hotword; and updating the context data of the computing device based on the data indicating the action associated with the audio data and the data indicating the actions performed by the computing device within the particular period of time after receiving the instruction to commence speech recognition processing on the audio data associated with the particular, predefined hotword.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user can speak a hotword in a room with multiple devices that are capable of responding to hotwords and only one device will respond. The user can speak a hotword and only the nearest device will respond to the hotword even if other devices hear the hotword. The system that selects the device to respond to the hotword can select an appropriate device based on the context of the device and other nearby devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
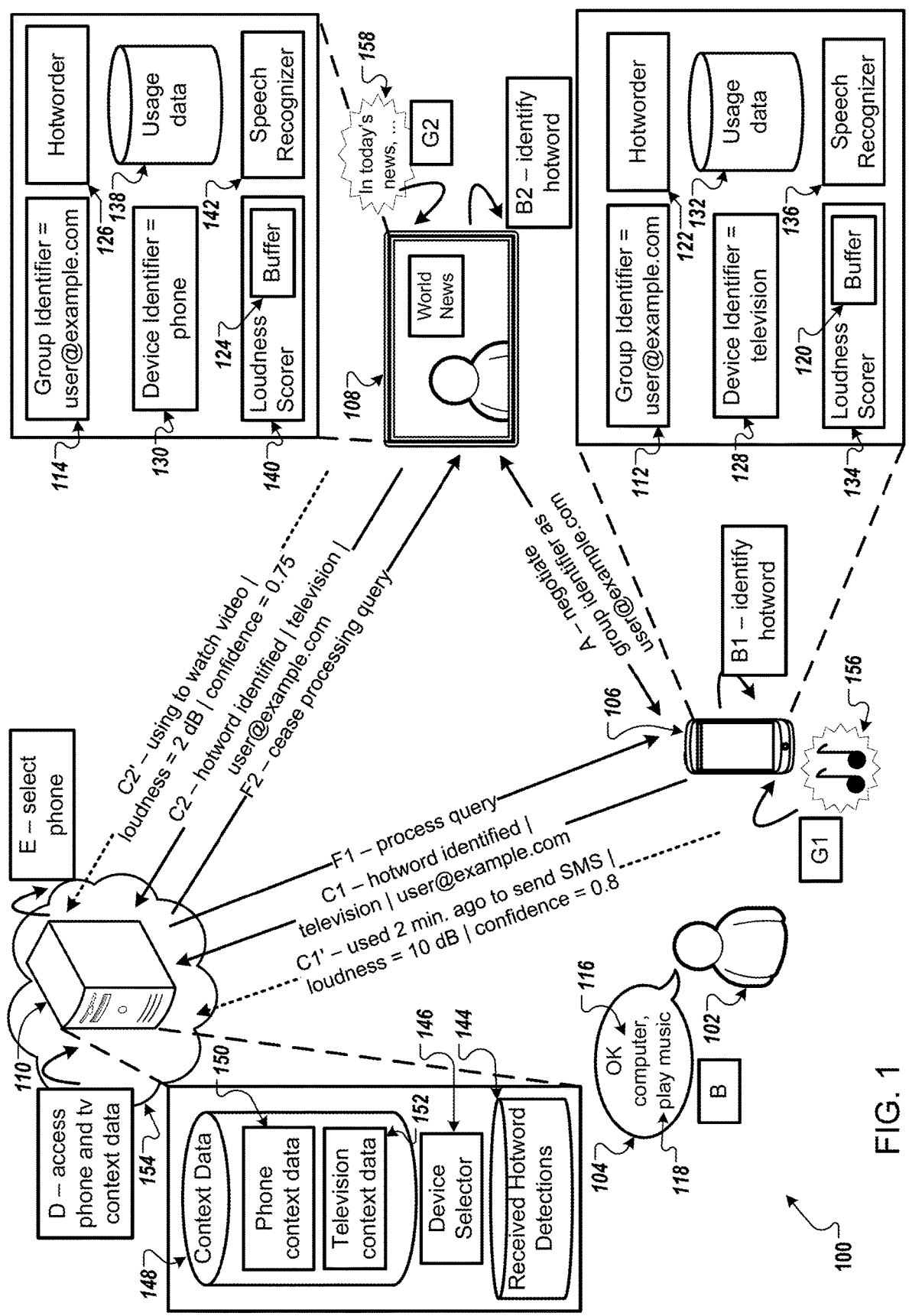
FIG. 1 is a diagram of an example system for hotword detection.

FIG. 1 illustrates an example system 100 for hotword detection. Briefly, and as described in more detail below, a user 102 speaks an utterance 104 that is detected by microphones of computing devices 106 and 108. The computing devices 106 and 108 process the audio data of the utterance 104 and determine whether the utterance 104 includes a hotword. Before performing speech recognition on the utterance 104, the computing devices 106 and 108 communicate with the server 110. The server 110 uses context data for both the computing device 106 and the computing device 108 to select one of the computing devices 106 or 108 to commence speech recognition on the audio data that includes the hotword. Based on the context data, the server 110 selects the computing device 106 and sends instructions to the computing device 106 to commence speech recognition on the audio data. The server 110 also sends instructions to the computing device 108 not to commence speech recognition on the audio data.

In the example shown in FIG. 1, the user 102 is in a room with both computing device 106, for example, a mobile phone, and computing device 108, for example, a television. When the user 102 speaks a voice command, both the phone 106 and the television 108 receive through their respective microphones the audio data that corresponds to the user's voice command. Both the phone 106 and the television 108 are configured to respond to voice commands, but it is unlikely that when the user 102 speaks "OK computer, play music" that the user 102 wishes for both the phone 106 and the television 108 to begin playing music. To avoid the situation of both devices responding to a voice command, the computing devices 106 and 108 may begin by identifying other devices in the nearby vicinity that are configured to respond to voice commands that include a hotword. The nearby vicinity may include devices that are on the same local network, devices that can communicate through a short range radio signals, or devices that are in a same room.

In some implementations, the phone 106 and the television 108 are on the same local network, for example, a home wireless network. The phone 106, or the television 108, communicates with the other devices on the network and identifies the devices that are configured to respond to voice commands that include a hotword. Once the phone 106 identifies the television 108 and confirms that the television 108 is also configured to respond to a hotword, the phone 106 and television 108, in stage A, negotiate a group identifier for use when notifying the server 110 that either the phone 106 or the television 108 has detected a hotword. For example, the group identifier may be the email address, user@example.com, of the user logged into one or both of the devices. The phone 106 stores user@example.com as the group identifier 112, and the television 108 stores user@example.com as the group identifier 114. In some implementations, this negotiation happens periodically to ensure that a device identifies nearby devices that are configured to respond to a hotword. For example, the negotiation can happen once an hour. Alternatively, a device can search for nearby devices when the device moves at least some threshold distance, for example, one hundred meters, as based on location data received by the device.

In some implementations, the phone 106 and the television 108 are on different networks. For example, the phone 106 is on a cellular network and the television 108 is on a local wireless network. In this instance, the phone 106 and the television 108 may be able to communicate through local short range radio and negotiate a group identifier. If the phone 106 and the television 108 are unable to communicate, then each device may select a group identifier that corresponds to the user who is logged into the device. For example, if the user 102 is logged into both the phone 106 and the television 108, then both devices may select the group identifier user@example.com.

At stage B, the user 102 speaks the utterance 104, "OK computer, play music." The utterance 104 includes both a hotword 116, "OK computer," and a voice command 118, "play music." Because the user 102 is close enough to the phone 106 and the television 108, both the phone 106 and the television 108 receive, through their respective microphones, the audio data that corresponds to the utterance 102.

At stage B1, the phone 106 receives and processes the audio data that corresponds to the utterance 102. The phone 106 includes a buffer 120. The buffer 120 stores the current audio received through the microphone of the phone 106. For example, the buffer 120 stores the previous five seconds of audio data. The hotworder 122 continuously analyzes the audio data stored in the buffer 120. The hotworder 122 computes a hotword confidence score that reflects the likelihood that current audio data in the buffer 120 includes a hotword. To compute the hotword confidence score, the hotworder 122 may extract audio features from the audio data such as filterbank energies or mel-frequency cepstral coefficients. The hotworder 122 may use classifying windows to process these audio features such as by using a support vector machine or a neural network. In some implementations, the hotworder 122 does not perform speech recognition to determine a hotword confidence score.

At approximately the same time that the phone 106 processes the utterance 104 and at stage B2, the television 108 processes audio data received through its microphone. The television 108 also includes a buffer 124 that stores the current audio data received through the microphone. For example, the buffer 124 may store the previous seven seconds of audio data. The hotworder 126 continuously analyzes the audio data stored in the buffer 124. The hotworder 126 continuously analyzes the audio data stored in the buffer 124. The hotworder 126 computes a hotword confidence score that reflects the likelihood that current audio data in the buffer 124 includes a hotword. To compute the hotword confidence score, the hotworder 126 may extract audio features from the audio data such as filterbank energies or mel-frequency cepstral coefficients. The hotworder 126 may use classifying windows to process these audio features such as by using a support vector machine or a neural network. In some implementations, the hotworder 126 does not perform speech recognition to determine a hotword confidence score.

As the phone 106 calculates a hotword confidence score for the audio data in the buffer 120, the phone 106 compares the hotword confidence score to a hotword confidence score threshold. If the hotword confidence score satisfies the hotword confidence score threshold, then the phone 106 proceeds to stage C1. For example, if the hotword confidence score is 0.8 and the threshold is 0.7, then the phone 106 proceeds to stage C1. The hotword confidence score threshold represents a hotword confidence score that likely corresponds to detecting a hotword. In instances where a user speaks, "OK computer" clearly and is near the receiving device, the hotword confidence score may be 0.9. Hotword confidence scores may decrease if the speaker is farther from the devices or speaks less clearly. In instances where a user speaks, "Call Alice," the hotword confidence score may be 0.1.

In stage C1, the phone 106 generates and transmits a data packet to the server 110. The data packet can include data that indicates that the phone 106 detected a hotword, a data identifier 128 for the phone 106, and the group identifier 112. The data that indicates that the phone 106 detected a hotword can include a flag that indicates the phone 106 detected a hotword or can include the hotword confidence score or both. The data identifier 128 for the phone 106 may be any unique identifier for the phone 106 such as the MAC address, the IMEI number, a user given name, phone number, or the serial number and model. In some implementations, the data identifier 128 at least includes the model of the phone 106.

During about the same time that the phone 106 computes the hotword confidence score and sends the server 110 the data packet that includes data that indicates that the phone 106 detected a hotword 116, a data identifier 128 for the phone 106, and the group identifier 112, the television 108 also calculates a hotword confidence score for the audio data in the buffer 124, the phone 106 compares the hotword confidence score to a hotword confidence score threshold. If the hotword confidence score satisfies the hotword confidence score threshold, then the television 108 proceeds to stage C2. For example, if the hotword confidence score is 0.75 and the hotword confidence score threshold is 0.7, then the television 108 proceeds to stage C2. The hotword confidence score for the television 108 may be lower than the hotword confidence score for the phone 106 because the user 102 is farther from the television 108 or because the television is currently displaying a television show with sounds that interferes with the microphone detecting the user's speech.

In stage C2 and similar to stage C1, the television 108 generates and transmits a data packet to the server 110 a data packet that can include data that indicates that the television 108 detected a hotword 116, a data identifier 130 for the television 108, and the group identifier 114. The data that indicates that the television 108 detected a hotword can include a flag that indicates the television 108 detected a hotword or can include the hotword confidence score or both. The data identifier 130 for the television 108 may be any unique identifier for the television 108 such as the MAC address, a user given name, or the serial number and model. In some implementations, the data identifier 130 at least includes the model of the television 108.

In some implementations and as illustrated in stage C1', the phone 106 sends additional data to the server. The additional data may include data that indicates a time elapsed since the phone 106 was previously used and how the phone 106 was used. For example, the user 102 may have previously used the phone 106 to send an SMS message two minutes prior to the phone 106 detecting the hotword 116. The phone 106 may store a history of the prior usage of the phone 106 in the usage data 132. Each entry in the usage data 132 may include any combination of an application used, an action performed by the phone 106, an action performed by the user 102, and a timestamp. In some implementations, the phone 106 may send additional data related to more than one previous action, for example, the previous three actions.

In some implementations and in stage C1', the phone 106 sends data that indicates a current state of the phone 106 when the phone 106 detected the hotword 116. For example, the current state may be that the phone 106 is asleep, the phone 106 is awake with the screen off or dimmed, or the phone 106 is awake and the user 102 is using the email application of the phone 106. In the example shown in FIG. 1, the phone 106 is currently in a sleep state when it detects the hotword 116.

In some implementations and as illustrated in stage C1', the phone 106 sends data to the server 110 that indicates the loudness of the detected hotword 116. The loudness scorer 134 accesses the buffer 120 and measures the loudness of the portion of audio data that corresponds to the hotword 116. In some implementations, the loudness scorer 134 calculates the power or the root mean square of the audio data that corresponds to the hotword 116. For example, the loudness scorer 134 may calculate the loudness to be fifty decibels. In some implementations, the loudness scorer 134 normalizes the power or the root mean square of the audio data that corresponds to the hotword 116 by subtracting the power or the root mean square of the audio data in the buffer 120 that does not correspond to the hotword 116. The audio data in the buffer 120 that does not correspond to the hotword 116 may correspond to the ambient noise around the phone 108. For example, the loudness scorer 134 calculates the power or the root mean square of about one second of audio data before the hotword 116 to be thirty decibels. Therefore, the loudness difference is ten decibels. The phone 106 may then send the loudness data to the server 110. In some implementations, the phone 106 may calculate the loudness of the entire utterance 104 or of only the voice command 116. The phone 106 may then transmit data indicating the loudness of the entire utterance 104 or of only the voice command 116 to the server 110.

In some implementations and as illustrated in stage C1', the phone 106 sends the hotword confidence score to the server 110. For example, the phone 106 calculates a hotword confidence score of 0.8 for the hotword 116 and transmits the score to the server 110. In some implementations, the phone 106 sends location data to the server 110. For example, the GPS unit on the phone 106 may detect a any combination of geographic location, geographic speed, and geographic movement, and the phone 106 may transmit that geographic location, geographic speed, and geographic movement to the server 110. As another example, the phone 106 may use triangulation to determine a geographic location. In some implementations, the speech recognizer 136 of the phone 106 may perform speech recognition on the audio data that is stored in the buffer 120 including the audio data that correspond to the hotword 116 or the voice command 118 or both. The speech recognizer 136 may calculate a speech recognition confidence score and transmit the speech recognition confidence score to the server 110. The speech recognition confidence score may reflect the likelihood that the transcription generated by the speech recognizer 136 is accurate. For example, the speech recognizer 136 may calculate a speech recognition confidence score of 0.7 and transmit the score of 0.7 to the server 110. In some implementations, the phone 106 transmits, to the server, 110 the transcription of the utterance 104 or only a portion of the utterance 104, for example, the hotword 116 or the voice command 118. For example, the speech recognizer 136 transcribes the voice command 118 and transmits "play music" to the server 110. In some implementations, the phone 106 also sends data that indicates the applications installed on the phone 106. For example, if the phone 106 has the application "Instant Movies" and "Love Music" installed, then the phone 106 may send data identifying "Instant Movies" and "Love Music." In some implementations, the phone 106 may have many applications installed.

In this case, the phone 106 may only send data identifying the most used applications, for example, the ten most frequently used applications.

In some implementations and as illustrated in stage C2', the television 108 sends additional data to the server. The television 108 sends additional data that is similar to the additional data described above with respect to the phone 106 in stage C1'. The television 108 may store usage data 138 that is related to previous uses of the television 108 and transmit the usage data to the server 110. For example, the television 108 may transmit data indicating that the user 102 previously used the "Instant Movies" application to watch "Love Story" two hours ago. The television 108 may transmit data that indicates it current state. For example, the television 108 may transmit data indicating that the television 108 is currently showing the World News Channel and has been for the past fifteen minutes.

The television 108 may compute the loudness of the utterance 104, the hotword 116, or voice command 118. The loudness scorer 134 may compute the loudness based on the power or the root mean square of the corresponding audio data. The loudness scorer 134 may also normalize the power or the root mean square of the corresponding audio data by subtracting the power or the root mean square of the audio data stored in the buffer 124 that does not correspond to the utterance 104. For example, the loudness scorer 134 may calculate the loudness of the hotword 116 to be thirty decibels and the loudness of the audio data received in the two seconds before the hotword 116 to be thirty-two decibels. Therefore, the loudness value sent to the server 110 is two decibels.

In some implementations, the television 108 sends a hotword confidence score. For example, the hotworder 126 may calculate a hotword confidence score of 0.75, and the television 108 transmits the score of 0.75 to the server 110. The television 108 may send its geographic location to the server 110. The speech recognizer 142 may perform speech recognition on the audio data in the buffer 124. The speech recognizer 142 may generate a transcription as well as a speech recognition confidence score. The television 108 may send the transcription or the speech recognition confidence score or both to the server 110. The television 108 may send data that indicates the applications installed on the television 108 or the most frequently installed applications. For example, the television 108 may send data that identifies the installed application of "Jungle Movies" and "Social Pictures."

The server 110 initially receives either the phone 106 data packet from stage C1 or the television data packet from stage C2, depending on which device processes and generates the data packet sooner and possible depending any network latency. In this example, the server 110 receives the phone 106 data packet first. Upon receiving the phone 106 data packet, the server 110 accesses the received hotword detections 144 and compares the group identifier of the phone 106 data packet to the group identifier data and timestamp data in the received hotword detections 144. The server 110 stores previously received data packets that are received in response to hotword detections in the received hotword detections 144. By comparing incoming data packets to stored data packets, the server 110 can use the device selector 146 to select the device to respond to the hotword.

In this example, the server 110 compares the data received from the phone 106. The server 110 searches the received hotword detections 144 and does not find other hotword detection data packets that include the group identifier 112, user@example.com. With no other user@example.com data packets, the server 110 stores the data packet along with a timestamp indicating the time of receipt in the received hotword detections 144. The server 110 compares subsequently received hotword detection data packets to the data packets stored in the received hotword detections 144. If a threshold period of time passes, for example, two seconds, and the server 110 does not receive any additional data packets with the group identifier user@example.com, then the server 110 will transmit a command to the phone 106 to commence speech recognition on the audio data and to respond to the command. After transmitting the command to the phone 106 to commence speech recognition, then the server 110 will remove the data packet received from the phone 106 from the received hotword detections 144. In some implementations, the phone 106 may not identify any nearby devices, and, in this case, may not communicate with the server 110. Instead, the phone 106 may commence speech recognition on the audio data without communicating with the server 110.

Within the threshold period of time, the server 110 receives a hotword detection data packet from the television 108. The data packet from the television includes the same group identifier, user@example.com. The server 110 may then use the device selector 146 to select a device to commence speech recognition on the audio data, or the server 110 may wait for a threshold period of time in case other hotword detection data packet arrive at the server 110 with the same group identifier. In the example of FIG. 1, the server 110 receives hotword detection data packets from the television 108 and from the phone 106 and uses the device selector 146 to select a device.

In stage D, the server 110 accesses the context data 148, and the device selector 146 uses the phone context data 150 and the television context data 152 to select a device to commence speech recognition on the audio data. The server 110 may gather context data while the user 102 uses the phone 106 and the television 108, especially in instances where the phone 106 or the television 108 access the server 110 or a server that shares data with the server 110. For example, the user 102 may play music on the phone 106 by accessing a streaming music service on a server in the cloud 154. The streaming music server may communicate with the server 110 that is also in the cloud 154 and share the data that the phone 106 accessed the streaming music service. The server 110 may then store that information in the phone context data 150 possibly along with a timestamp. As another example, the user 102 may use the phone 106 to send an email using an email application that interacts with a server in the cloud 154. The email server may communicate with the server 110 and the server may store phone context data 150 that indicates the user 102 accessed the email application on the phone 106 along with a timestamp.

Similarly, the server 110 may receive television context data 152 from other servers in the cloud 154 that communicate with the television 108. For example, the user 102 may use the television to perform an internet search using a search engine that is in the cloud 154. The search engine may communicate with the server 110, and the server 110 may store television context data 152 that indicates the user 102 accessed the search engine on the television 108 along with a timestamp. As another example, the user 102 may use the television 108 to watch a video using a streaming video service from a server in the cloud 154. The streaming video server may communicate with the server 110, and the server 110 may store television context data 152 that indicates that the user 102 watched a video using the streaming video server, along with a timestamp. In some implementations, the phone context data 150 and the television context data 152 may include location data. For example, the phone context data may include data indicating the geographic location of the phone 106 when the user accessed the streaming music server.

In some implementations, the context data 148 may include or have access to data that describes capabilities of various devices. The capabilities may include whether the device has a camera, cellular radio, short range radio, GPS, or other components. The capabilities may also include specifications of the device such as screen size, screen resolution, processor type and speed, memory, etc. The context data 148 may not actually store this capability data. Instead the context server 110 may be able to query another server to retrieve device capability data. In some instances, the context server 110 may store some capability data within the context data 148 for some more commonly used devices such as popular phone models.

To select a device to commence speech recognition on the utterance 104, the device selector 146, at stage E, may consider a number of factors, and, in some instances, the device selector 146 may not have access to all the factors each time that the device selector 146 selects a device. In some implementations, the device selector 146 may select the device that detected the highest loudness for the hotword 116. For example, the phone 106 detected a hotword loudness that was normalized of ten decibels. The television 108 detected a hotword loudness that was normalized of two decibels. The device selector 146 may select the phone 106 because the hotword loudness was the greatest. In some implementations, the device selector 146 may have access to hotword loudness levels and the previous use of each device. In this instance, the device selector 146 may disregard the hotword loudness levels and instead select the device that was used most recently. For example, if the phone 106 was more active recently according to the phone context data 150 and the television context data 152, then the device selector 146 may select the phone 106. In some implementations, the device selector 146 may have access to context data that indicates that the television 108 is currently in use by displaying a video and the phone 106 has not been used in the last ten minutes. The device selector 152 may select the phone 106 to respond to commence speech recognition on the utterance 104 because the phone 106 is not being used.

In some implementations, the sever 110 may receive a hotword confidence score. In this instance, the device selector 146 may select the device with the highest hotword confidence score. In some implementations, the server 110 may receive location data and select a device based the user 102 being in a location where one of the devices is used more commonly than the other. For example, the devices may be a tablet and a phone. When the user 102 is away from the geographic locations that correspond to the user's home or work, then the context data 148 may reflect that the user 102 is more likely to use the phone instead of the tablet. Accordingly, when the user 102 speaks the hotword 116 and the phone and tablet send hotword detection packets that include location information to the server 110, then the server 110 may select the phone if the device selector 146 determines that the user 102 is not at home or work.

In some implementations, the server 110 may receive a transcription of the voice command 118. In this instance, the devices have already performed speech recognition on the voice command 118 and the device selector 146 selects a device to act on the voice command 118. With the transcription of the voice command, the device selector 146 can access the context data 148 to select an appropriate device to respond to the voice command. For example, if the voice command is "Call Alice," then the device selector 146 would select the phone 106 to process the voice command because the user 102 typically uses the phone 106 to call even in the case where the television 108 is configured to process voice calls or because the phone 106 is the only device configured to process voice calls.

In some implementations, the device selector 146 may use the current or previous use of the device to select a device to respond to the voice command. The current or previous use may be related to the voice query. For example, the voice command may be, "stop playing music." If the device selector 146 has access to context data 148 that describes one of the devices as playing music, then the device selector 146 selects the device that is playing music to respond to the voice command. As another example, the voice command may be, "show the music video again." If the device selector 146 has access to context data 148 that indicates that one of the devices played a music video for "Rock Group" in the last ten minutes, then the device selector 146 will select that device to respond to that voice command.

In some implementations, the server 110 may receive a speech recognition confidence score from each device. The device selector 146 may select the device with the highest speech recognition confidence score. For example, the phone 106 may calculate a speech recognition confidence score of 0.7 and the television 108 may calculate a speech recognition confidence score of 0.65. The device selector 146 selects the phone 106 to respond to the search query as a consequence of the higher speech recognition confidence score.

In some implementations, the server 110 may receive context data related to the applications installed on the phone 106 and television 108. The device selector 146 may use the context data related to the installed applications to select a device to respond to the voice query. For example, the voice command may be "play Super Ninja." The device selector 146 may have context information that the phone 106 has Super Ninja installed. Therefore, the device selector 146 selects the phone 106 to respond to the "play Super Ninja" command. In some implementations, the server 110 may receive data indicated installed applications if the user downloads the applications from an application server in the cloud 154 and the application server communicates with the server 110 regarding the installed applications.

In stage E, the server 110 selects a device to perform speech recognition on the voice command and then perform the voice command. In the case where the server 110 receives a transcription of the voice command, the server 110 selects a device to perform the voice command. In the example show in FIG. 1, the server 110 selects the phone 106 based on the television context data 152 that indicates that the television is currently being used, so the phone 106 may be better to respond to a new voice command. In instances where the server 110 receives a transcription of the voice command 118, the server may use context data that indicates the television 108 is showing a video while the phone 106 is idle to determine that the phone should respond to the "play music" the voice command. The device selector 146 may the use any of the criteria described above in any combination and weight each factor differently to select a device.

In stage F1 and F2, the server 110 transmits the instructions to the phone 106 and television 108. The instructions for the phone 106 instruct the phone 106 to process the query and commencing speech recognition on the utterance 104, if necessary. The instructions for the television 108 instruct the television 108 to cease processing the query.

In stages G1 and G2, the phone 106 and television 108 execute the instructions received by the server 110. The phone 106 processes the utterance 104, possibly by performing speech recognition, and then playing music 156. The television does not process the utterance 104 and continues to show the news video 158.

In some implementations, the phone 106 and television 108 may transmit to the server the actions performed by the user 102 after the phone 106 and television 108 process the utterance 104. For example, if the phone 106 begins to play music 156 and the user 102 quickly turns off the music 156, then changes the television 108 from showing the news video 158 to playing music. The phone 106 and television 108 then report these actions back to the server 110. The server 110 may update the selection algorithm of the device selector 146 using machine learning. With machine learning, the server 110 may change the weights given to each of the items of context data to select the most likely device to process the utterance 104. In some implementations, the machine learning may be user specific. For example, the device selector 146 may adjust the selection algorithm based on user 102's tendency to use the phone 106 during traditional business hours and the television outside of business hours or based on the user's tendency to use particular devices when in particular locations.

In some implementations, two devices, possibly of the same type, may end up in the same room and both are associated with a different group identifier. In this instance, when each device sends a hotword detection data packet to the server 110, the server 110 receives and compares the group identifier from the received data packets to the group identifiers stored in the received hotword detections 144 that are from other recently received data packets. With different group identifiers, the server 110 may not determine that only one device should respond to the hotword. To remedy this potential issue, the devices may be configured to send one or more of geographic location data, hotword loudness data, speaker identification data, device context data, speech recognition confidence scores, hotword confidence scores, and a transcription of the utterance 104. The server 110 may identify that two hotword detection data packets include geographic location data that are within a threshold distance of each other, for example, ten meters, and that the server 110 received within less than a threshold time of each other, for example, one second. In this case, the server 110 may determine that even though the devices were associated with different group identifiers, only one should respond to the hotword. To select the device to respond to the hotword, the device selector 146 may, for example, select the loudness data and confidence scores that are the highest and instruct the corresponding device to respond to the hotword while instructing the other devices not to respond to the hotword. In instances where the server 110 receives the transcription of the utterance 104, the server 110 may determine that the hotword detection data packets correspond to the same utterance because the text of the utterance 104 was the same and the data packets were received at about the same time. The device selector 146 may the select the device to respond to the utterance 104 based on the transcription, device capabilities and context, geographic location data, hotword loudness data, speaker identification data, speech recognition confidence scores, and hotword confidence scores using any of the techniques described above.

In some implementations, the voice command 118 associated with a single instance of a hotword may include more than one command. In certain instances, it may be appropriate for more than one device to process the commands, either serially or in parallel. For example, a user 102 may speak, "OK computer, play Love Story and call mom." In this instance, it may be better for the phone 106 to handle the call and the television 108 to handle playing the movie "Love Story". For the server 110 to provide instructions to both the phone 106 and the television 108, the server 110 may need the transcription of the utterance 104. With the transcription of the utterance 104, the device selector 146 may identify the two commands in the utterance 104 and the nearby devices that are best equipped to handle the commands based on the context data of each device and the capabilities data of each device. In this example, the device selector 146 may determine that the television 108 is better equipped to show "Love Story" because the television 108 has a larger screen and more powerful speakers than the phone 106. The device selector 146 may determine that the phone 106 is better equipped to handle the telephone call because the phone 106 has a cellular radio. The server 110 may then send instructions to the phone 106 to call mom and to the television 108 to play the movie "Love Story."

In some implementations, the phone 106 and television 108 may not transmit hotword detection packets to the server 110 and instead negotiate between each other to determine which device should respond to the hotword 116. The devices may use the context of the devices, for example, geographic location and motion data, to determine which one should respond to the hotword. For example, if the user 102 is moving at, on average or periodically, greater than fifteen miles per hour, then there is a high likelihood that the user 102 is traveling in a car. If the car is configured to respond to a hotword, then the car may communicate with any other nearby device and notify the other devices that the car will respond to the hotword. The car may still utilize communication features of other device, such as the car completing a call through a mobile phone, but the car will originate the telephone call. In instances where the user 102 is in the car, but not moving for a threshold period of time, then the car may not notify the other devices that it will respond to any hotwords or notify the other devices to communicate with the server 110 upon detecting a hotword. The car and the other devices may communicate with the server 110 and receive instructions from the server 110 when responding to hotwords.

In some implementations, the phone 106 or the television 108 or any other device may present an interface that permits the user 102 to enter a preference for which device responds to a hotword. For example, the user 102 may enter into the interface that when the user 102 is with the phone 106 and the television 108, then the user 102 prefers for the phone 106 to respond to a hotword. The user 102 may also be able to select an option that allows the server 110 to override the user's preference in instances where a device may be incapable of performing the voice command. In instances where the server 110 does not receive the transcription of the utterance, then the server 110 may select the device according to the user preference. As an example of a server override, the server 110 may receive hotword detection data packet from both the phone 106 and the television 108. The hotword detection data packets include the transcription of the voice command, which may be "OK computer, turn on "World News Now." The user 102 has previously selected that when the user 102 is near the television 108 and the phone 106, that the phone 106 should respond to a voice command. However, in this case, the phone 106 is not configured to show the news program "World News Now" because the phone 106 does not have access to the service that provides that news program. Accordingly, the server 110 instructs the television 108 to respond to the hotword and voice command and the phone 106 not to respond to the hotword and voice command.

Figure 2:
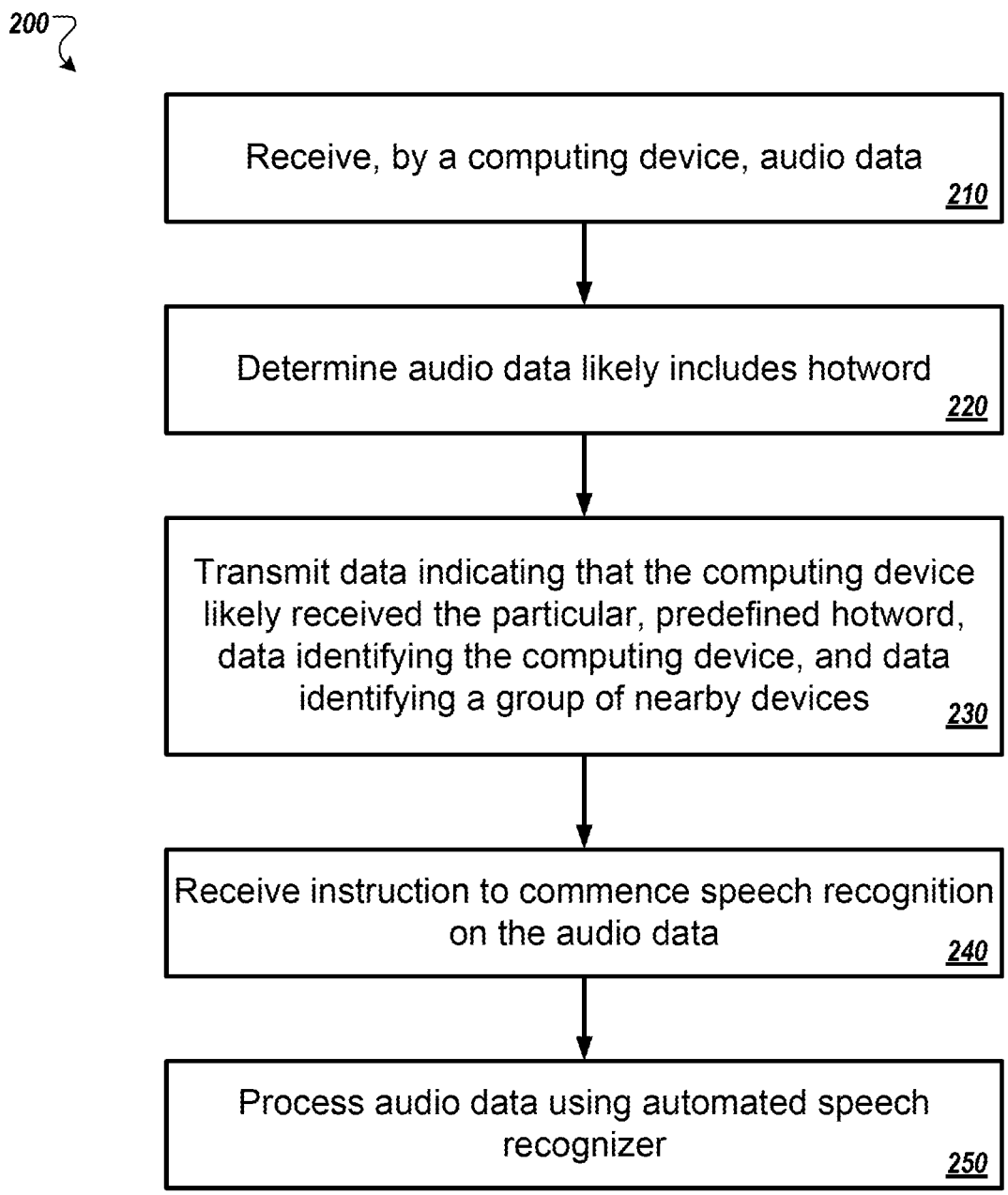
FIG. 2 is a flowchart of an example process for hotword detection.

FIG. 2 illustrates an example process 200 for hotword detection. In general, the process 300 processes audio data, and based on the audio data likely including a hotword, the process commences speech recognition on the audio data if instructed by a server. The process 200 will be described as being performed by a computer system comprising one or more computers, for example, the mobile device 106 or the television 108 as shown in FIG. 1.

The system receives audio data that corresponds to an utterance (210). For example, the user may receive audio data that corresponds to the user speaking, "OK computer, give me directions home." In some implementations, the system may receive from another system, data indicating that the other system is configured to respond to hotwords. The system and the other system may negotiate a group identifier that each can include in data packets to send to the server when either the system or the other system detects a hotword. For example, the group identifier may be an email address of the user logged into one or both of the devices. In some implementations, the system receives audio data when it is in a sleep state and with the screen off. In this case, the system may remain in a sleep state and still receive and process the audio data. In some implementations, the system may be in an active state, such as playing a video. In this case, the system receives and processes the audio data and continues to play the video.

The system determines that the utterance likely includes a particular, predefined hotword (220). For example, the system may determine that the utterance likely includes "OK computer." In some implementations, the system may be in a sleep state and upon receipt of identifying the hotword, the screen of the system activates, possibly on a dimmed low power state, and indicates the system is processing audio data.

The system, in response to determining that the utterance likely includes the particular, predefined hotword, transmits, to a server, (i) data indicating that the computing device likely received the particular, predefined hotword, (ii) data identifying the computing device, and (iii) data identifying a group of nearby computing devices that includes the computing device (230). In some implementations, the data identifying the computing device is the model and the serial number. In some implementations, the data identifying a group of nearby computing devices is the group identifier. In some implementations, the system determines a loudness of the audio data that corresponds to the hotword and transmits the loudness to the server in response to determining that the utterance likely includes the hotword. For example, the system may determine the loudness to be thirty decibels and transmit that value to the server. In some implementations, the system determines the power of the audio data that corresponds to the hotword and the power of the audio data received just before the hotword. The system then computes the difference between the two values and transmits the difference to the server in response to determining that the utterance likely includes the hotword.

In some implementations, the system determines a hotword confidence score that reflects the likelihood that the system detected a hotword. The system then transmits the hotword confidence score to the server in response to determining that the utterance likely includes the hotword. The system may use a neural network to determine the hotword confidence score. In some implementations, the system may transmit its geographic location to the server in response to determining that the utterance likely includes the hotword. In some implementations, the system may transmit data indicating an elapsed time since a previous use of the computing device and possibly including the previous action. For example, the user may have used the system two minutes ago to send a text message. The system may transmit this information to the server.

The system receives, from the server, an instruction to commence speech recognition processing on the audio data (240). For example, the system performs speech recognition on the audio data that does not correspond to the hotword and determines the transcription, "give me directions home." In some implementations, the system may receive an instruction not to commence speech recognition on the audio data. In some implementations, the system may have already have performed speech recognition on the audio data and transmitted the transcription to the server. In this instance the system may receive an instruction to process the voice command in the transcription or not to process the voice command. If the system receives an instruction not to process the voice command, then the system may return to its previous state such as a sleep state or displaying a video. The system, in response to receiving the instruction to commence speech recognition processing on the audio data, processes at least a portion of the audio data using an automated speech recognizer on the computing device (250). The system may then execute any voice command spoken by the user. For example, the system may provide the user directions to the user's home.

Figure 3:
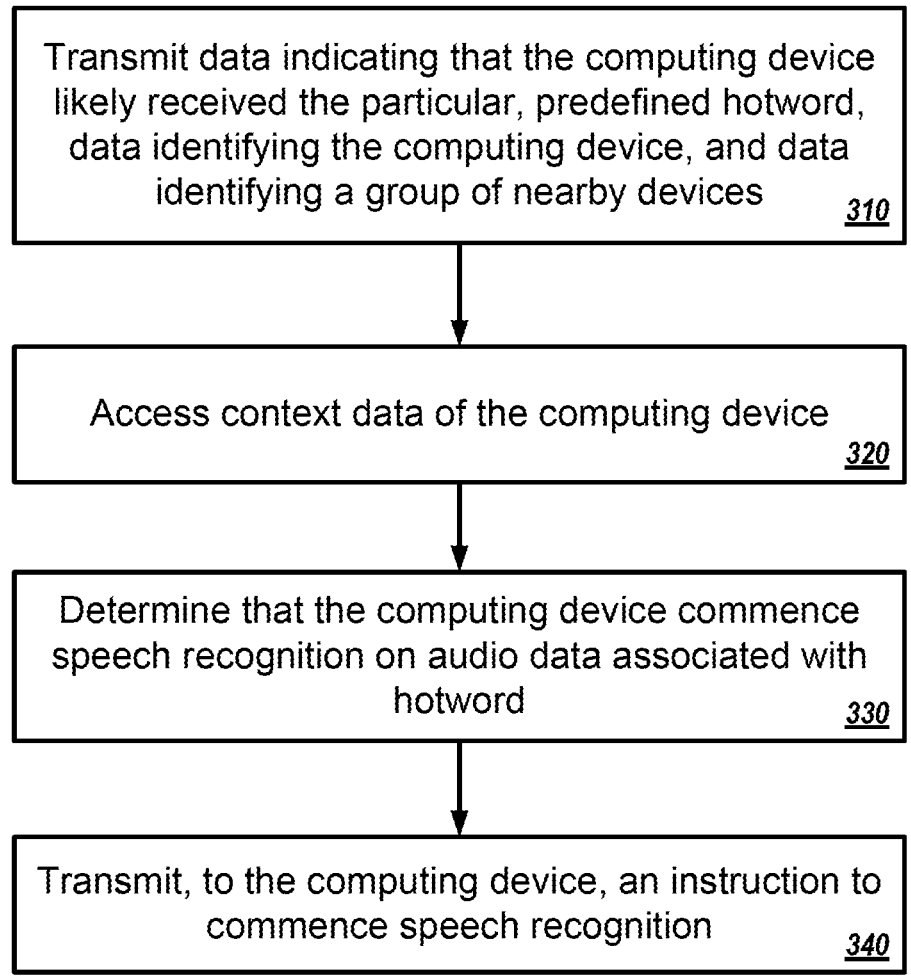
FIG. 3 is a flowchart of an example process for hotword detection.

FIG. 3 illustrates an example process 300 for hotword detection. In general, the process 300 selects a computing device to commence speech recognition on audio data that likely includes a hotword. The process 300 will be described as being performed by a computer system comprising one or more computers, for example, the server 110 as shown in FIG. 1.

The system receives, from a computing device, (i) data indicating that the computing device likely received a particular, predefined hotword, (ii) data identifying the computing device, and (iii) data identifying a group of computing devices that are near the computing device and that includes the computing device (310). In some implementations, prior to receiving this data, the server receives data indicating that the computing device and maybe another computing device are configured to respond to a hotword. If the devices are nearby each other, then server selects a group identifier to identify the group when notifying that the computing device detected a hotword.

The system accesses context data that indicates a context of the computing device (320). In some implementations, the context data corresponds to the capabilities of the computing device. The system may access the capabilities data based on the model number provided by the computing device. For example, a phone may have a camera, short range radio, five inch screen, memory card slot, etc. In some implementations, the context data corresponds to an elapsed time since a previous use or a previous action or both of the computing device. For example, the previous use may be watching a news video and that may be occurring at the same time the computing device detected the hotword. The computing device may provide the time since the previous use and previous action. In some implementations, the system may access the data or receive the data from other servers. In some implementations, the context data includes a loudness of the audio data corresponding to the hotword.

In some implementations, the system receives geographic location data from the computing device.

The system, based on the context data of the computing device, determines that the computing device commence speech recognition processing on audio data associated with the particular, predefined hotword (330). In some implementations, the audio data corresponds to an utterance, such as, a user speaking, "OK computer, give me directions home." In some implementations, the system selects the computing device based on any combination of the capabilities of the device, the location of the device, the time since the device was last used, the last action performed by the device, or the loudness of the audio data. In some implementations, the system may not have enough information to select a computing device. In this instance, the system may prompt the computing device to preform speech recognition on the utterance and provide a transcription of the utterance. The system may then use the context data and the transcription to select the computing device. In some implementations, the system may prompt the computing device for additional context information instead of or in addition to prompting for the transcription. For example, the system may prompt the computing device for confidence scores of the hotword and the speech recognition.

The system transmits, to the computing device, an instruction to commence speech recognition processing on the audio data associated with the particular, predefined hotword (340). In some implementations, the system may transmit an instruction not to commence speech recognition processing to other computing devices not selected by the system.

In some implementations, the system may receive data from the computing device identifying the actions taken by the user after the computing device processed the audio data. The computing device may execute the voice command of the audio data and have a user stop the execution of the voice command. The user may then manually execute the action of the voice command on the computing device not selected by the system. In this instance, the system will receive this data and determine that the system selected the wrong device to respond to the hotword. The system may then use machine learning to adjust the selection algorithm. In some implementations, the selection algorithm may be user specific.

Figure 4:
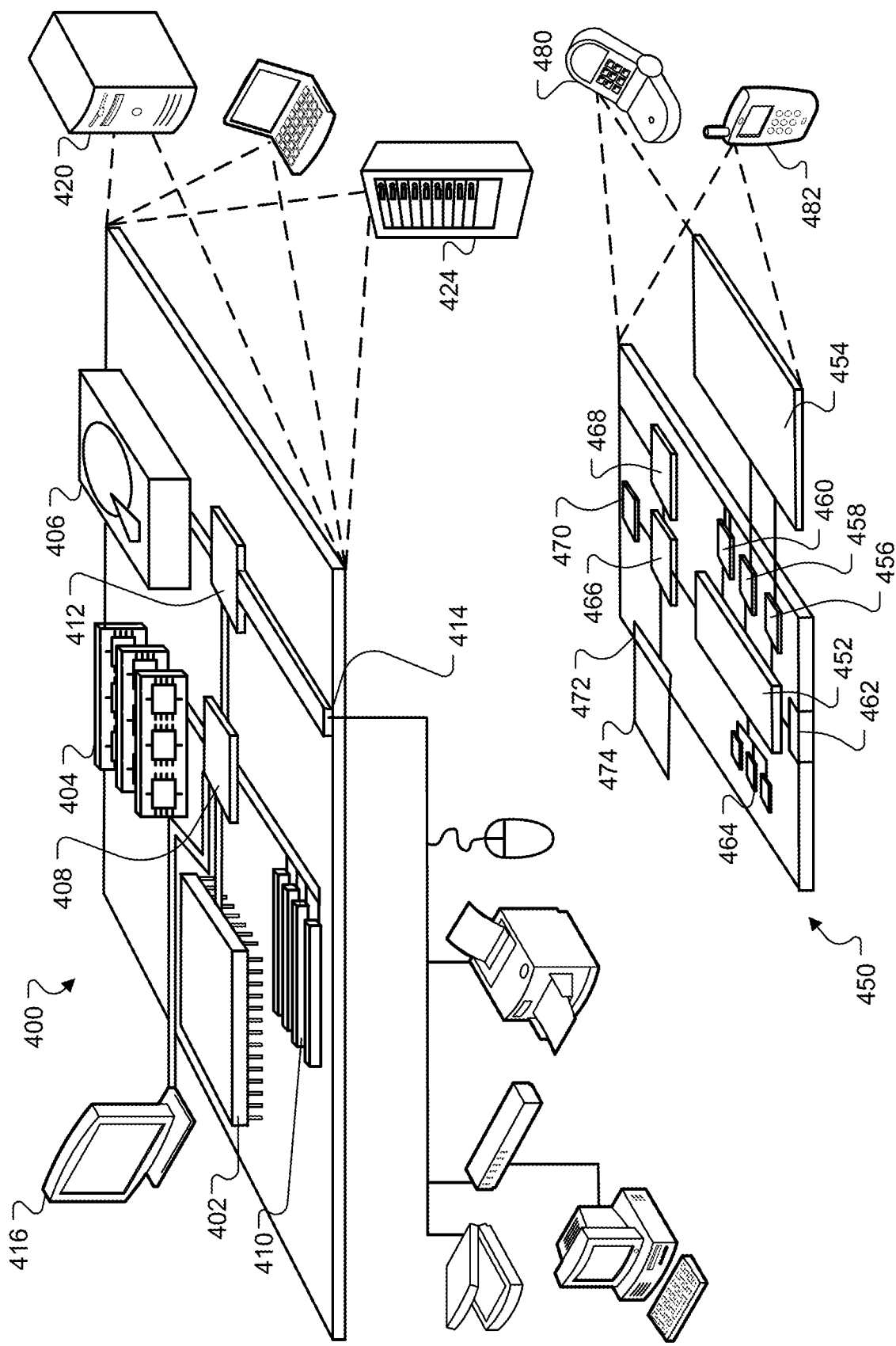
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a first computing device, from a second computing device that is in a vicinity of the first computing device, data indicating that the second computing device is configured to respond to a particular, predefined hotword;
receiving, by the first computing device, audio data of an utterance that includes a particular, predefined hotword;
based on receiving, from the second computing device that is in the vicinity of the first computing device, the data indicating that the second computing device is configured to respond to the particular, predefined hotword, providing, to a third computing device, data indicating that the first computing device received the particular, predefined hotword, data indicating that the second computing device is in the vicinity of the first computing device, and the data indicating that the second computing device is configured to respond to the particular, predefined hotword; and based on receiving, from the third computing device, an instruction to perform a command that follows the particular, predefined hotword, performing, by the first computing device, the command.

2. The method of claim 1, further comprising:
determining, by the first computing device, that the utterance likely includes the particular, predefined hotword, wherein providing the data indicating that the first computing device received the particular, predefined hotword and the data indicating that the second computing device is in the vicinity of the first computing device and configured to respond to the particular, predefined hotword is further based on determining that the utterance likely includes the particular, predefined hotword.

3. The method of claim 1, wherein the first computing device is configured to respond to the particular, predefined hotword.

4. The method of claim 1, further comprising, based on the second computing device that is configured to respond to the particular, predefined hotword being in a vicinity of the first computing device, providing, by the first computing device, data identifying the first computing device.

5. The method of claim 1, wherein the third computing device transmits, to the second computing device, an instruction to suppress performance of the command that follows the particular, predefined hotword.

6. The method of claim 1, wherein:
the first computing device includes a first microphone that receives the audio data of the utterance, and
the second computing device includes a second microphone that receives the audio data of the utterance.

7. The method of claim 1, wherein the third computing device does not include a microphone.

8. The method of claim 1, wherein the third computing device is not configured to respond to the particular, predefined hotword.

9. The method of claim 1, wherein the first computing device is configured to respond to the particular, predefined hotword.

10. A system comprising:
one or more computers; and
one or more computers and one or more storage devices storing instructions that are operable, when executed by the one or more computers, to cause the one or more computers to perform operations comprising:
receiving, by a first computing device, from a second computing device that is in a vicinity of the first computing device, data indicating that the second computing device is configured to respond to a particular, predefined hotword;
receiving, by the first computing device, audio data of an utterance that includes a particular, predefined hotword;
based on receiving, from the second computing device that is in the vicinity of the first computing device, the data indicating that the second computing device is configured to respond to the particular, predefined hotword, providing, to a third computing device, data indicating that the first computing device received the particular, predefined hotword, data indicating that the second computing device is in the vicinity of the first computing device, and the data indicating that the second computing device is configured to respond to the particular, predefined hotword; and
based on receiving, from the third computing device, an instruction to perform a command that follows the particular, predefined hotword, performing, by the first computing device, the command.

11. The system of claim 10, wherein the operations further comprise:
determining, by the first computing device, that the utterance likely includes the particular, predefined hotword, wherein providing the data indicating that the first computing device received the particular, predefined hotword and the data indicating that the second computing device is in the vicinity of the first computing device and configured to respond to the particular, predefined hotword is further based on determining that the utterance likely includes the particular, predefined hotword.

12. The system of claim 10, wherein the operations further comprise, based on the second computing device that is configured to respond to the particular, predefined hotword being in a vicinity of the first computing device, providing, by the first computing device, data identifying the first computing device.

13. The system of claim 10, wherein the third computing device transmits, to the second computing device, an instruction to suppress performance of the command that follows the particular, predefined hotword.

14. The system of claim 10, wherein:
the first computing device includes a first microphone that receives the audio data of the utterance, and
the second computing device includes a second microphone that receives the audio data of the utterance.

15. The system of claim 10, wherein the third computing device does not include a microphone and is not configured to respond to the particular, predefined hotword.

16. A non-transitory computer-readable medium storing software comprising instructions executable by one or more computers which, upon such execution, cause the one or more computers to perform operations comprising:
receiving, by a first computing device, from a second computing device that is in a vicinity of the first computing device, data indicating that the second computing device is configured to respond to a particular, predefined hotword;
receiving, by the first computing device, audio data of an utterance that includes a particular, predefined hotword;
based on receiving, from the second computing device that is in the vicinity of the first computing device, the data indicating that the second computing device is configured to respond to the particular, predefined hotword, providing, to a third computing device, data indicating that the first computing device received the particular, predefined hotword, data indicating that the second computing device is in the vicinity of the first computing device, and the data indicating that the second computing device is configured to respond to the particular, predefined hotword; and
based on receiving, from the third computing device, an instruction to perform a command that follows the particular, predefined hotword, performing, by the first computing device, the command.

* * * * *